Patented Feb. 21, 1933

1,898,532

UNITED STATES PATENT OFFICE

MAX HARDTMANN, OF WIESDORF-ON-THE-RHINE, WILHELM SCHEPSS, OF LEVER-KUSEN-ON-THE-RHINE, AND ERNST TIETZE, OF COLOGNE-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF PREPARING BORON TRIFLUORIDE

No Drawing. Application filed June 17, 1929, Serial No. 371,712, and in Germany June 22, 1928.

The present invention relates to a process of preparing boron trifluoride.

The known methods of manufacturing boron trifluoride consist in causing a metallic fluoride and boric acid anhydride to react upon each other in sulfuric acid.

In accordance with the present invention, boron trifluoride is prepared by causing boric acid or a borate capable of being decomposed by sulfuric acid, such as alkali metal and alkaline earth metal borates, and a metal fluoride capable of being decomposed by sulfuric acid, for example, alkali metal and alkaline earth metal fluorides, and sulfuric acid to react together at elevated temperature in the presence of a dehydrating agent. The process is most simply carried out with the use of sulfuric acid containing sulfuric acid anhydride. A sufficient excess of sulfuric acid, however, can also be used as dehydrating agent.

A modification of the process consists in adding boric acid to the readily obtainable fluoro sulfonic acid which may also contain sulfuric acid, boron trifluoride being obtained in excellent yield, said process being for the purpose of the invention equivalent to that described above.

The relative quantities of the boric acid or borate used and the metallic fluoride may be varied within wide limits, but generally about equimolecular quantities are used. The temperature required for carrying out the reaction can vary within a wide range, say between about 100° C. and the boiling point of the reaction mixture, the best results being obtained by slowly heating the reaction mixture to about 150° C. to 200° C.

These processes yield the theoretical amounts calculated on the quantities of boric acid or borate employed. As compared with the other processes, the possibility of avoiding the manufacture of boric acid anhydride and the powdering of extremely hard and yet elastic anhydride which moreover greedily attracts water in the finely divided state and thus reduces the yield of boron trifluoride, constitutes a considerable technical advance.

The invention is illustrated by the following examples, without being limited thereto:

*Example 1:*—62 kgs. of commercial boric acid are introduced while stirring into 610 kgs. of sulfuric acid containing 20% of sulfuric acid anhydride. 120 kgs. of powdered fluorspar are then added while stirring. The reaction mixture is heated gradually, finally to 180°–200° C. 22,000 liters (that is 68 kgs.) of boron trifluoride are obtained, this being a quantitative yield of gaseous, very pure boron trifluoride calculated on the boric acid.

Instead of the boric acid a borate, for example, borax can also be used.

*Example 2:*—62 parts by weight of boric acid are stirred into 300 parts by weight of fluoro sulfonic acid with cooling. The mixture is then heated gradually to 175° C. The yield of boron trifluoride is quantitative.

We claim:

1. The process which comprises heating about equimolecular quantities of a compound of the group consisting of boric acid and the alkali metal and alkaline earth metal borates and a compound of the group consisting of the alkali metal and alkaline earth metal fluorides in concentrated sulfuric acid, in the presence of a dehydrating agent at temperatures above 100° C.

2. The process which comprises heating about equimolecular quantities of a compound of the group consisting of boric acid and the alkali metal and alkaline earth metal borates and a compound of the group consisting of the alkali metal and alkaline with metal fluorides in concentrated sulfuric acid, in the presence of a dehydrating agent to a temperature between about 100° C. and the boiling point of the mixture.

3. The process which comprises heating about equimolecular quantities of a compound of the group consisting of boric acid and the alkali metal and alkaline earth metal borates and a compound of the group consisting of the alkali metal and alkaline earth metal fluorides in concentrated sulfuric acid, in the presence of a dehydrating agent to a temperature of about 150°–200° C.

4. The process which comprises heating about equimolecular quantities of a compound of the group consisting of boric acid and the alkali metal and alkaline earth metal borates and a compound of the group consisting of the alkali metal and alkaline earth metal fluorides in concentrated sulfuric acid containing sulfuric acid anhydride at temperatures above 100° C.

5. The process which comprises heating about equimolecular quantities of a compound of the group consisting of boric acid and the alkali metal and alkaline earth metal borates and a compound of the group consisting of the alkali metal and alkaline earth metal fluorides in concentrated sulfuric acid containing sulfuric acid anhydride to a temperature between about 100° C. and the boiling point of the mixture.

6. The process which comprises heating about equimolecular quantities of a compound of the group consisting of boric acid and the alkali metal and alkaline earth metal borates and a compound of the group consisting of the alkali metal and alkaline earth metal fluorides in concentrated sulfuric acid containing sulfuric acid anhydride to a temperature of about 150°–200° C.

7. The process which comprises heating about equimolecular quantities of boric acid and fluorspar in concentrated sulfuric acid in the presence of a dehydrating agent to a temperature above 100° C.

8. The process which comprises heating about equimolecular quantities of boric acid and fluorspar in concentrated sulfuric acid in the presence of a dehydrating agent to a temperature between about 100° C. and the boiling point of the mixture.

9. The process which comprises heating about equimolecular quantities of boric acid and fluorspar in concentrated sulfuric acid in the presence of a dehydrating agent to a temperature of about 150°–200° C.

10. The process which comprises heating about equimolecular quantities of boric acid and fluorspar in concentrated sulfuric acid containing about 20% of sulfuric acid anhydride to a temperature above 100° C.

11. The process which comprises heating about equimolecular quantities of boric acid and fluorspar in concentrated sulfuric acid containing about 20% of sulfuric acid anhydride to a temperature between about 100° C. and the boiling point of the mixture.

12. The process which comprises heating about equimolecular quantities of boric acid and fluorspar in concentrated sulfuric acid containing about 20% of sulfuric acid anhydride to a temperature of about 150°–200° C.

In testimony whereof we have hereunto set our hands.

MAX HARDTMANN.
WILHELM SCHEPSS.
ERNST TIETZE.